Figure 4:
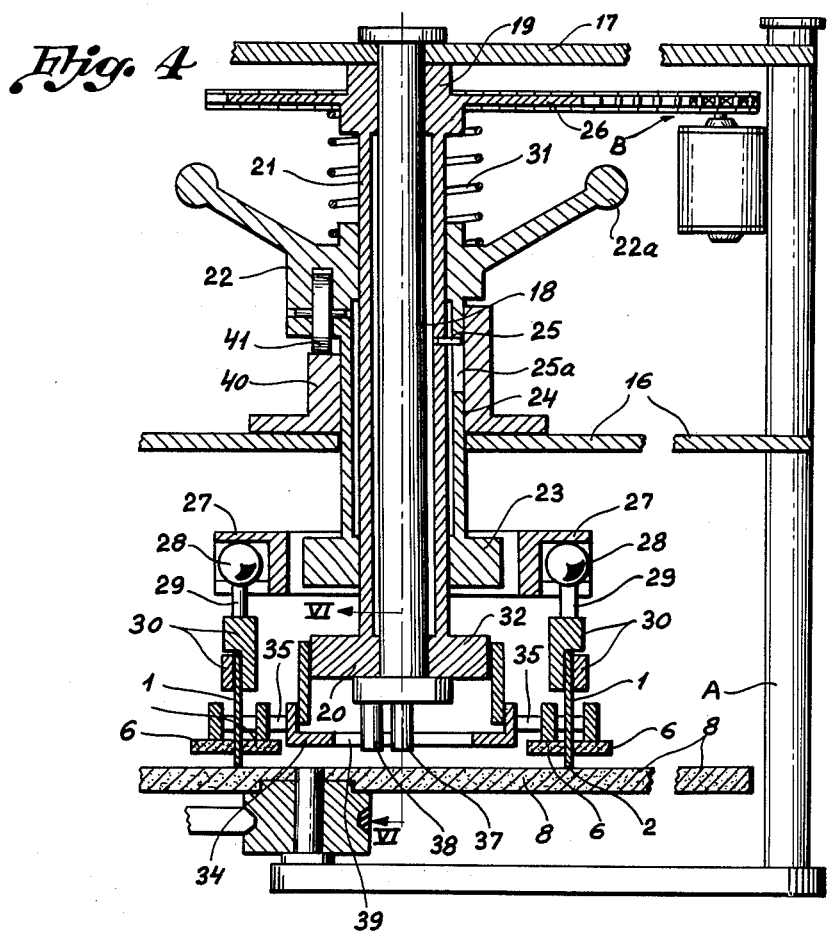

Dec. 30, 1958 S. V. GRUM-SCHWENSEN 2,866,300
DEVICE FOR GRINDING SCRAPER BLADES
Filed Nov. 5, 1953 6 Sheets-Sheet 1
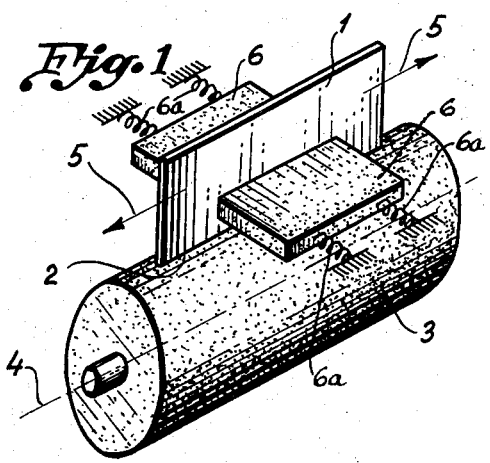
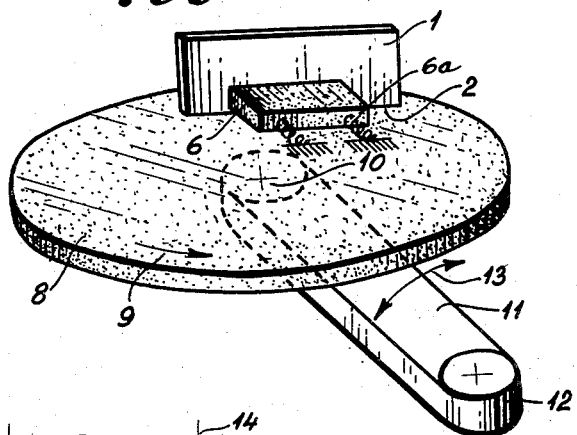
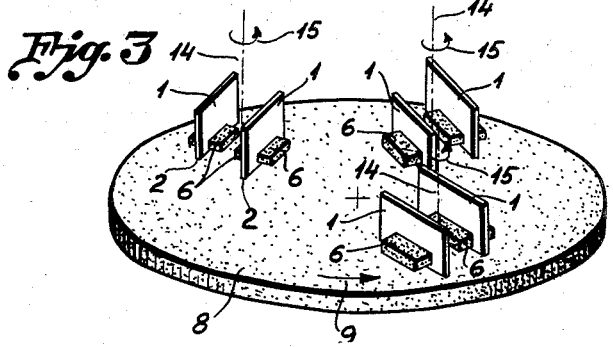
INVENTOR.

Dec. 30, 1958 S. V. GRUM-SCHWENSEN 2,866,300
DEVICE FOR GRINDING SCRAPER BLADES
Filed Nov. 5, 1953 6 Sheets-Sheet 2

INVENTOR.
Sofus Valdemar Grum Schwensen
BY
Rummler Rummler & Snow

Dec. 30, 1958 S. V. GRUM-SCHWENSEN 2,866,300
DEVICE FOR GRINDING SCRAPER BLADES
Filed Nov. 5, 1953 6 Sheets-Sheet 6

Fig. 9

INVENTOR.
S. Grum-Schwensen

_United States Patent Office_

2,866,300
Patented Dec. 30, 1958

2,866,300

DEVICE FOR GRINDING SCRAPER BLADES

Sofus Valdemar Grum-Schwensen, Allerød, Denmark

Application November 5, 1953, Serial No. 390,337

12 Claims. (Cl. 51—3)

This invention relates to an improved device for grinding scraper blades having at least one edge surface to be ground.

Amongst the requirements for such grinding devices the most important are that the finished blades have sharp cutting edges without nicks or the like, and operation of the grinding device must be so simple that a single man without special training can complete the grinding of so great a number of scraper blades per time unit that the use of the device is profitable.

In the only hitherto known grinding device for scraper blades each scraper blade is first set-up in a blade holder or carrier, one edge surface is ground, the blade is then inverted in the carrier and the opposite edge surface is ground. After this the blade has to be set-up in another part of the grinding device where the side faces of the blade are ground in order to take off burrs formed by the grinding of the edge surfaces, and this latter setting-up necessitates thus two more operations. Owing to these many operations the grinding of scraper blades becomes altogether so complicated a matter that most often scraper blades are ground by hand.

An object of this invention is to indicate a device for grinding scraper blades by which it is possible in a single operation and in a simple manner to obtain sharp cutting edges without nicks or the like at least at one edge surface of a scraper blade.

Another object of the invention is to indicate a device for grinding scraper blades having at least one edge surface to be ground, by which several times in succession the scraper blade is ground alternately by means of an edge surface grinding member on the edge surface and by means of at least two side face grinding members on each sideface of the scraper blade at the side edges of the edge surface. Hereby is attained partly that the work of setting-up the scraper blades is substantially diminished, and partly that the grinding itself is improved because the alternate grinding of the edge surfaces and the side faces will produce a sharper and more even cutting edge than it has hitherto been possible to produce on the hitherto known machine mentioned above.

A further object of the invention is to provide a scraper blade grinding device of the kind described, which is relatively simple in construction and automatic in its operation from the time a scraper blade is placed in the device.

A still further object of the invention is to provide a scraper blade grinding device by which in a single operation at least at one edge of a scraper blade several times in succession alternately the edge surface is ground by means of an edge surface grinding member and the side faces of the scraper blade at the edges of the said edge surface is ground by means of at least two side face grinding members abutting either side of the scraper blade.

With these and other objects in view, the invention resides in the novel features of construction and combinations and arrangements of parts as more fully hereinafter set forth.

Figure 5:
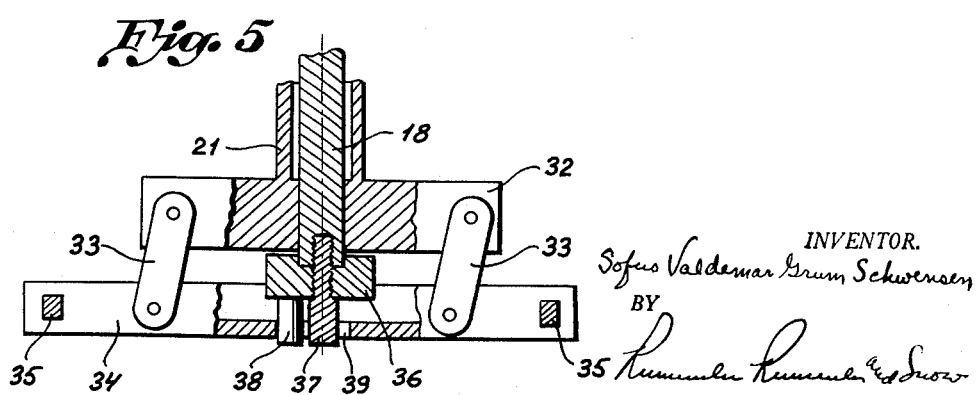
Figure 6:
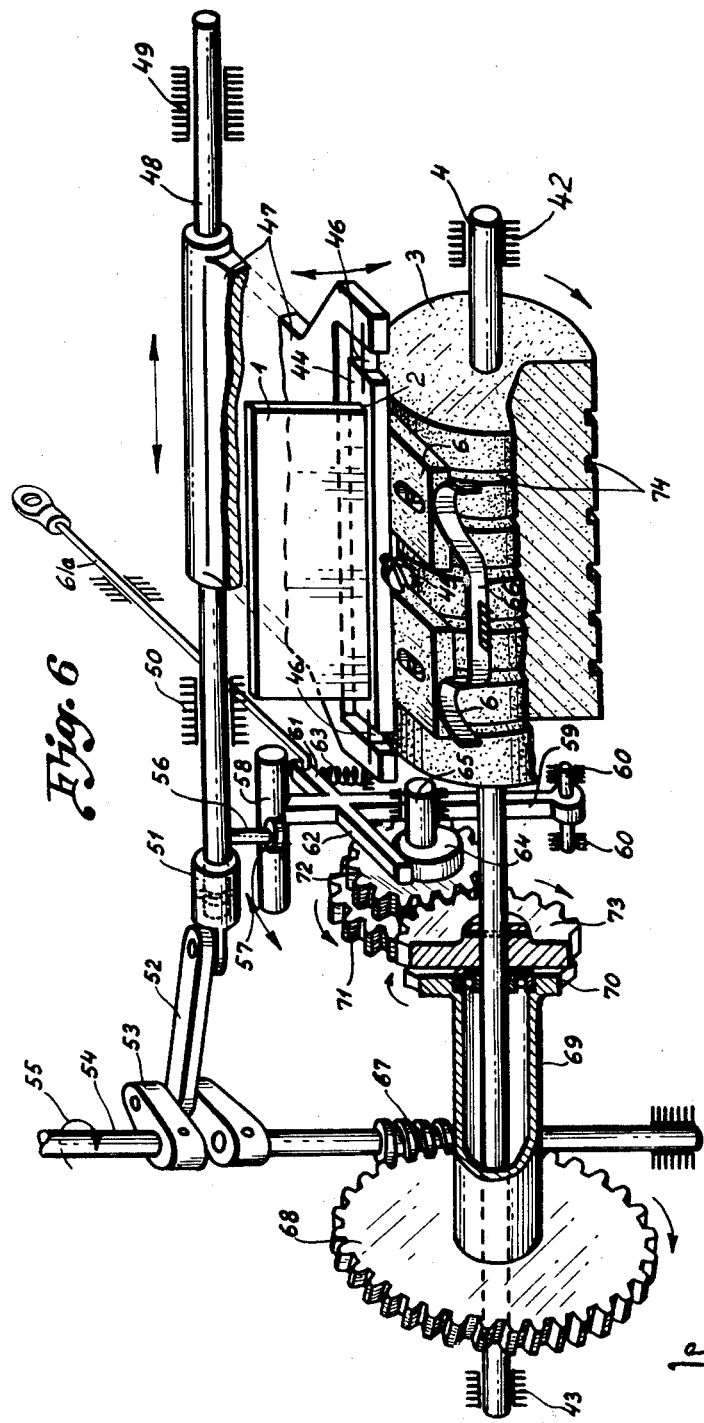
Figure 7:
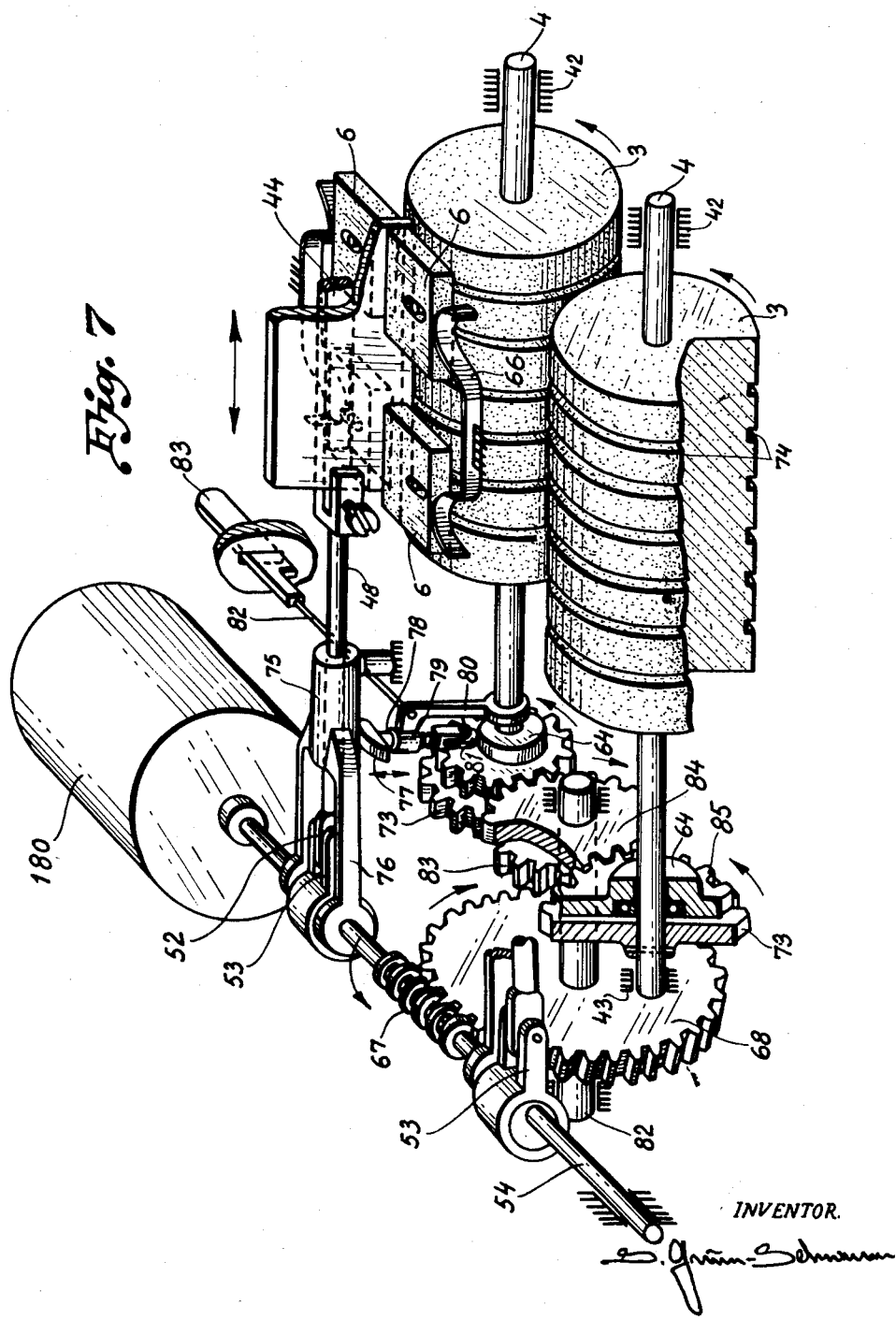
Figure 8:
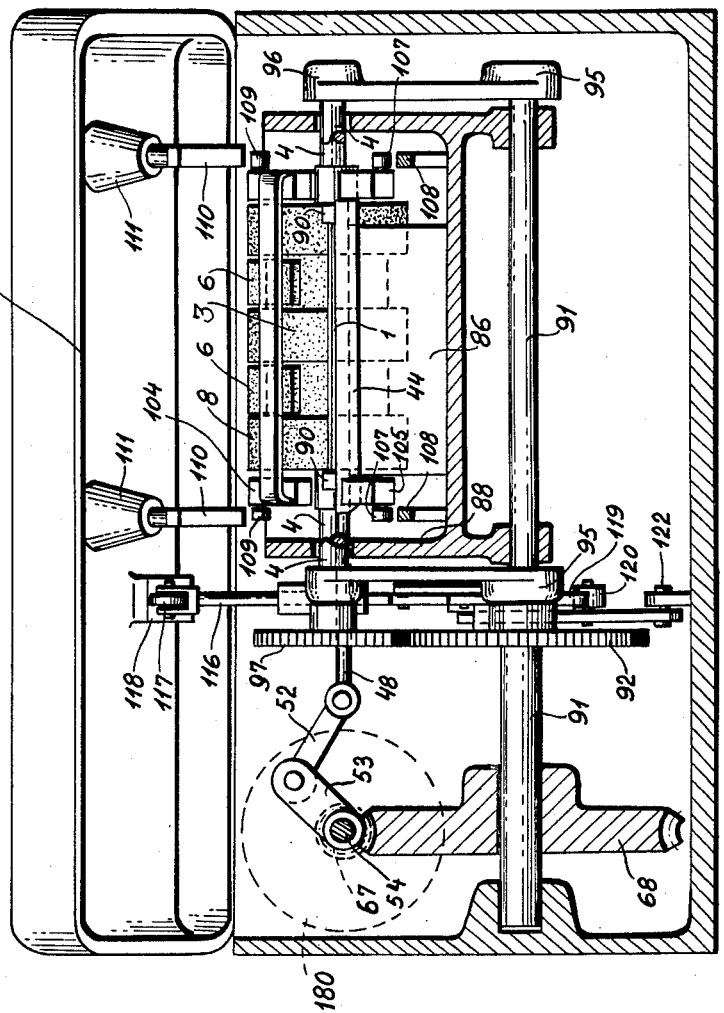

In the accompanying drawings forming a part of this specification and in which like numerals are employed to designate like parts throughout the same, Figs. 1 to 3 show schematically and in perspective views the principle of the invention in four different embodiments of the invention, Fig. 4 is a sectional view through a spindle with scraper blade carriers for a practical embodiment of the grinding machine shown in Fig. 3, Fig. 5 is a section on line VI—VI in Fig. 4, Fig. 6 shows an embodiment of a grinding machine operating on the principle according to Fig. 1, Fig. 7 is another embodiment of a machine similar to that shown in Fig. 6 but intended for grinding two scraper blades at a time, and Figs. 8 and 9 show in plan elevation and in section respectively a grinding machine in which both sides of a scraper blade may be ground simultaneously.

Referring to Fig. 1, a scraper blade indicated by 1 is placed with its edge surface adjacent the surface of an edge surface grinding member 3 formed as the surface of a cylinder rotatable on its axis 4. Owing to the rotation of this cylinder 3 the edge surface 2 of the scraper blade 1 is ground when the scraper blade is pressed against the grinding member 3. To avoid wear of the grinding member 3 along the same part thereof, either the grinding member 3 or the scraper blade 1 must be axially displaceable as indicated by arrows 5 as regards the scraper blade 1. Somewhat above the grinding cylinder 3 and on either side of the scraper blade a stationary side face grinding member 6 is arranged and is pressed against the side faces of the scraper blade. When the scraper blade 1 has been ground for some time along its edge surface 2, it is raised by means of members not disclosed in this figure, so that it is displaced such a distance above the cylinder 3 that the side faces adjacent the edge surface lie between the grinding surfaces of grinding members 6 and are ground for taking off the burrs which were formed during the grinding of the edge surface. When the scraper blade has been ground a short while in this position it is again moved down against the cylindrical grinding member 3 for renewed grinding of the edge surface, and several times in succession these operations are alternated until the grinding operation is completed. After this the scraper blade is inverted and the opposite edge surface is treated in the same manner.

In the type of device illustrated in Fig. 2 the scraper blade 1 lies with its edge surface 2 on an edge surface grinding member 8 shaped as a flat disc which rotates in the direction indicated by an arrow 9. The shaft 10 of this grinding disc is journalled in the one end of an arm 11, the other end 12 of which is journalled to oscillate on a stationary shaft (not shown). The arm 11 may, as indicated by arrows 13, perform a reciprocating oscilaltion so that the greater part of the grinding surface of disc 8 may contact the edge surface 2 of the scraper blade, and thus distribute wear of the disc surface. Also in this instance there is arranged, somewhat above the surface of the grinding disc 8, a grinding member 6 on either side of the scraper blade 1 abutting the side faces thereof, and these grinding members are, as in every case when the scraper blade 1 is raised from the grinding disc 8 to a position in which the side faces adjacent the edge surface are opposite the grinding surfaces of the grinding members 6, reciprocated parallel to the scraper blade for grinding the side faces adjacent the edge surface 2.

In Fig. 3 is shown a type of the grinding device in which there is likewise employed a grinding disc 8 rotatable on a shaft (not shown). On the grinding surface of this disc 8 the edge surfaces 2 of three pairs of scraper blades 1 rest, each pair being rotatable on an axis 14 in the direction indicated by an arrow 15. On each side face of each scraper blade 1, as shown in detail in Figs. 5 and 6, there is arranged a grinding member 6 for grinding the side faces adjacent the edge surface, and which grinding members 6 are reciprocated at least when the scraper blade is raised from the grinding disc 8.

The arrangement of each pair of scraper blades 1, and their operating means, are shown on a larger scale in detail in Figs. 4 and 5.

In an appropriate frame A supporting the shaft of the rotatable grinding disc 8, two plates 16 and 17 are rigidly attached thereto. Plate 17 has attached thereto a fixed shaft 18 which is carried downwardly through a hole in plate 16 to a short distance above the surface of the grinding disc 8. Shaft 18 carries bearing bushings 19 and 20 which are interconnected by means of a hollow rotatable auxiliary spindle 21. Surrounding this spindle there are two bearings 22 and 23 integral with a hollow spindle 24 longitudinally displaceable in relation to the auxiliary spindle 21, e. g. by means of a screw 25 in the auxiliary spindle 21 projecting through an axial slot 25a in the spindle 24. To the auxiliary spindle 21 is attached a driving wheel 26 positioned between the fixed plates 16 and 17 which driving wheel may be driven from a driving mechanism B.

Between the grinding member 8 and the fixed plate 16 the spindle 24 supports a carrier 27 provided with laterally arranged bearings for two ball joints 28. Each of these ball joints 28 is attached to the one end of a rod 29, the other end of which carries a clamp device or holder 30 for the scraper blade 1, which blade rests with its lower edge surface upon the surface of grinding member 8, and is subjected to spring-actuation by means of a pressure coil spring 31 inserted between the bearing bushing 19 and the bearing 22, the spring pressing the latter member, and with it the axially displaceable spindle 24, towards the grinding member 8.

As also shown in Fig. 5 the lower end of the auxiliary spindle 21 has attached thereto a carrier 32 for a link system in parallel 33, 33, the downwardly extending ends of the links being pivotally attached to an abutment member 34 which carries a pair of grinding members 6 fastened by means of rigid rods 35. The grinding members 6 are by means of a spring (not shown) pressed against either side face of the scraper blade 1. To the lower end of the fixed shaft 18 facing the grinding disc 8 a plate member 36 is connected adjustably rotatably by means of a screw 37 on which it may be rotated for adjustment. A pin 38 is attached to the lower side of the plate 36 and projects through an elongated slot 39 in the abutment member 34. The size of this slot 39 is such that the eccentrically disposed pin 38, during rotation of the abutment member 36, will strike the side of the slot 39 and thus impart a rocking motion to the abutment member suspended in the link system 33, 33.

A cam 40 is attached to the fixed plate 16, and above the cam 40 a cam roller 41 is journalled in the lower side of the bearing 22.

The device described in connection with Figs. 4 and 5 operates in the following manner.

During a part of each rotation performed by the spindle 24 and the auxiliary spindle 21, cam roller 41, pressed against cam 40 by means of spring 31 causes the carrier 27, and with it the scraper blade 1, to be raised from the grinding disc 8 so that the edge surface of the scraper blade is moved in between the grinding members 6.

By means of screw 37 pin 38 is so adjusted in relation to the fixed shaft 18 that the grinding members 6, while the scraper blade 1 is raised from the grinding disc 8, performs a rocking motion in its suspension 33, 33. This produces an arched grinding movement between the scraper blade 1 and the grinding members 6. Pin 38 and cam 40 are preferably so adjusted that the scraper blade 1 is raised when the longitudinal direction of its edge surface is perpendicular to the tangent on the rotation circle of the edge surface grinding member 8, i. e. the position in which wear upon the grinding member 8 otherwise would be greatest.

Exchange of scraper blades in the device shown in Figs. 5 and 6 takes place by raising the blades by means of a handle 22a attached to bearing 22 whereby spindle 24 is displaced upwardly so that the scraper blades are raised above the scraper members 6, and owing to their ball joints the carriers may be turned outwardly to a horizontal position in which they are easy to handle.

An embodiment of a grinding device according to the principle indicated in Fig. 1, is shown partly schematically and in perspective view in Fig. 6. This device is provided with a cylindrical edge surface grinding member 3 mounted on a shaft 4 rotatably journalled in bearings 42 and 43. Above the grinding member 3 is arranged a scraper blade carrier or holder 44 in which a scraper blade 1 may be clamped by means of a clamp screw 45.

The carrier 44 is by means of leaf springs 46 connected to supporting member 47 attached to a driving rod 48. This rod is rotatably journalled and longitudinally displaceable in stationary bearings 49 and 50 disposed on a frame or support only shown by symbols. The end of rod 48 at the left-hand side of Fig. 6 is engaged for limited rotation in a bushing 51 attached to the one end of a connecting rod 52, the other end of which is attached to a crank 53 attached to a driving shaft 54 rotatably journalled in the frame. This shaft 54 is rotated by any appropriate means (not shown) in the direction indicated by an arrow 55, thus imparting to the driving rod 48 a reciprocal motion in its bearings 49 and 50.

To the driving rod 48 is attached a pin 56 carrying a roller 57 disposed opposite an elongated abutment member 58. This member 58 has such a length that it may engage the roller 57 irrespective of the displacement of the driving rod 48. The abutment member 58 is mounted on the upper end of a rod 59, the lower end of which is oscillatorily journalled in bearings 60, 60 in the frame, the rod being further provided with two laterally extending arms 61 and 62. The one arm 61 is acted upon by a pressure spring 63 which continuously endeavours to hold the abutment member 58 against the abutment roller 57. The other arm 62 lies over a cam disc 64 attached to a shaft 65 rotatable journalled in the frame. The rotation of shaft 65 produced in a manner described later, causes the arm 62 to engage an eccentric portion of a cam disc 64 to the effect that the abutment member 58 is thrust away from the abutment roller 57. This eccentric portion of cam disc 64 is so shaped that the abutment member 58 only engages the abutment roller 57 a very short time during each rotation performed by the cam disc.

When abutment member 58 engages abutment 57, the driving rod 48 is oscillated in such a manner that the supporting member 47 swings upwardly, thus raising the scraper blade from the grinding member 3. This oscillation is so great that the edges of the lower edge surface 2 of the scraper blade 1, after the blade is swung away from the grinding member 3, is raised between side face grinding members 6 positioned a short distance above the grinding member 3 and displaceable towards the side faces of the scraper blade, against which they are held resiliently by means of a spring 66. There are two grinding members 6 on either side of the scraper blade in the embodiment illustrated, but the table or the like support in which they are supported and the means for holding them in position and guiding them are not shown.

The means for operating grinding member 3 and cam disc 64 comprise a worm 67 mounted on shaft 54 and engaging a worm wheel 68 attached to a tubular shaft 69 rotatably journaled on shaft 4. This tubular shaft carries furthermore a gear wheel 70 meshing with another gear wheel 71 which has a few more teeth than gear wheel 70. Gear wheel 71 is attached to shaft 65 and thus operates cam disc 64. Shaft 65 carries furthermore a gear wheel 72 having a few teeth less than gear wheel 71 and meshing a gear wheel 73 on shaft 4, so that this gear wheel 73 operates the shaft 4.

Thus, this gearing causes partly that the grinding member 3 and the cam disc 64 are rotated at a speed considerably slower than the rotational speed of the driving shaft 54, and consequently slower than the reciprocations of the driving rod 48, and partly that cam disc 64 is rotated at a speed different, but not much different, from the speed of the grinding member 3. The result of this is that the scraper blade 1 is raised from the edge surface grinding member 3 and again moved to contact this member at parts thereof, which differ for each rotation performed by the grinding member 3. In this manner is attained that the wear on the grinding member is evenly disrtibuted along its entire surface.

As it is important that the oscillations performed by the scraper blade about the axis of rod 48 always are of proper value, it is possible forcibly to move abutment member 58 away from abutment roller 57 irrespective of the position of cam disc 64. The means, for producing this action may, e. g. as shown, consist of a pull wire 61a connected to arm 61. Thus, when a scraper blade 1 is to be inserted in position, it is possible to make sure that the scraper blade carrier 44 is always in the same position in relation to grinding member 3, which position is determined by limitation of the rotation of the driving rod 48 in relation to the bushing 51. The scraper blade 1 can thus always be inserted in exactly the same position relative to the scraper blade carrier 44.

The grinding member 3, in the embodiment shown in Fig. 6, is provided with a number of annular grooves 74, which have been found to produce a more uniform grinding and less wear than would be the case if these grooves were omitted.

In operation the machine illustrated in Fig. 6 will be subjected to some vibration on account of the reciprocating action of the scraper blade carrier 44 and appurtenant driving members. These vibrations may be eliminated in various manners. The vibrations may, however, also be eliminated by construction of the machine as a dual machine for grinding two scraper blades at a time.

Such a dual machine for grinding is shown in Fig. 7 and is provided with two cylindrical grinding members 3, each attached to a separate shaft 4 journalled in bearings 42, 43. Above each of these two grinding members 3 is arranged a scraper blade carrier 44, one only being shown in the drawing, which is directly connected to the driving rod 48 that is guided axially in a bushing 75. By means of a short connecting rod 52, driving rod 48 is connected to an eccentric or crank 53 on driving shaft 54. The two eccentrics or cranks 53 are arranged in such a manner that their theoretical crank arms extend in opposite directions so that the two scraper blade carriers 44 are operated in alternate directions and thus to some extent will eliminate the inertia forces produced by vibrations. Each guide bushing 75 is attached to an arm 76 that oscillates on driving shaft 54. An oscillation of the guide bushing 75 will thus impart to driving rod 48 a swinging motion which will not affect the reciprocating motion of the rod, but will cause the scraper blade carrier, and the scraper blade attached thereto, to be moved away from the grinding member 3 to a position between the grinding members 6.

The means for swinging guide bushing 75 comprise an abutment member 77 attached to the upper end of a rod 78 slidable in a bushing 79 attached to an arm 80 which is mounted to oscillate on the shaft 4 of the appurtenant grinding member 3. Rod 78 carries on its lower end a roller 81 engaging the cam disc 64. Each time the roller 81 engages the eccentric portion of cam 64, rod 78 is raised and thus swings the guide bushing 75 upwardly and consequently raising the scraper blade away from its grinding member 3. Arm 80 is attached to one end of a laterally extending draw rod 82, the other end of which is provided with a handle 83 which by means of suitably arranged notches may be fixed in various positions, viz. the position shown in which abutment 77 lies opposite the guide bushing, and in a position in which the abutment is moved away from the bushing. To ensure that the abutment 77 after being moved away from the guide bushing 75, at any time can be moved back again to its operative position, irrespective of the momentary position of cam disc 64, the upper side of abutment 77 is arched.

In the embodiment illustrated here, discs 64 and the grinding members 3 are driven by means of a common worm drive 67, 68, the worm wheel 68 being attached to a shaft 82 to which is likewise attached two gear wheels 83 and 84 having different numbers of teeth. The gear wheel 83 meshes with the gear wheels 73 attached to the shafts 4, and gear wheel 84 meshes with gear wheels 85 each of which is rotatable on its shaft 4 and connected to the cam disc 64 on shaft 4. 180 indicates a driving motor for driving shaft 54.

Figs. 8 and 9 illustrate an embodiment of the grinding machine according to the invention in which it is possible simultaneously to grind both edge surfaces of a scraper blade, thus completing the grinding in a single operation. This machine has a driving shaft 54 rotatably journalled in a housing 87 and provided with a crank 53 imparting through a connecting rod 52 a reciprocating motion to the driving rod 48. This driving rod 48 is provided with a scraper blade carrier 44 shaped as a bar having a dovetailed incision engaged by a likewise dovetailed guiding member 86 rigidly mounted within the housing 87 upon an intermediate part thereof.

The housing 87 in this manner of construction is provided with a lid 89 hingedly attached to the housing wall.

The upper surface of the scraper blade carrier has two projections 90 spaced a distance from each other corresponding to the length of a scraper blade, and which are the only means for guiding the scraper blade. The driving shaft 54 carries a worm 67 meshing a worm wheel 68 attached to a shaft 91 journalled in the housing 87. This shaft 91 carries a gear wheel 92 meshing with an equally large gear wheel 93 attached to a shaft 94 which is rotatably journalled in stationary bearings in the housing 87. Within the housing 87 each shaft 91 and 94 has concentrically journalled thereon a pair of arms 95, the upper ends of each pair having bearings 96 for one of shafts 4 carrying a cylindrical edge surface grinding member 3. Each shaft 4 carries a gear wheel 97 meshing gear wheels 92 and 93 respectively, so that the grinding members 3 are rotated through this gearing.

The arms 95 nearest gear wheels 92 and 93 are interconnected by means of a toggle joint comprising partly an arm 98 connected to the one arm 95, and partly a bell crank lever 99, 100 connected to the other arm 95, the long arm 99 of which constitutes the other link of the toggle joint. To the lever fulcrum pin 101 a connecting link 102 is rotatably attached, and to this connecting link the one end of a drag spring 103 is attached, the other end of the spring being attached to a fixed part within the housing. The spring 103 tends to swing arms 95, and with them the grinding members 3, towards each other. Fulcrum pin 101 is furthermore guided in a vertical slot (not visible in the drawing) in the housing part 88 to ensure a symmetrical oscillation of the grinding members 3 to and from each other.

When a scraper blade 1 is placed in the carrier 44, and the toggle joint is allowed to move freely, the drag spring 103 will cause the grinding members 3 to be pressed against the two edge surfaces of the scraper blade with an equal pressure. On account of the symmetrical movement of the two grinding members 3 the scraper blade 1 will always lie in its middle position. It is to be noted that the guiding member 86 is arranged in such a manner that the scraper blade 1, when the grinding members are in their operative position, lies substantially in a plane through the axes of the two grinding members.

In this embodiment the side face grinding members 6 are mounted in split carriers each comprising two carrier parts 104 and 105. These grinding member carriers are arranged to reciprocate on shafts 4, and the two parts 104 and 105 of each carrier are hingedly connected to each other at the side thereof farthest from the grinding members 6. Further, the two parts 104 and 105 of each carrier are interconnected by means of a drag spring 106 which tends to swing the carrier parts apart. To the lower carrier part 105 is rotatably attached a roller 107 which may be caused to contact a stationary abutment 108. This abutment 108 has such an extension that, irrespective of the position of arms 95, it will always be able to contact roller 107.

Preferably there is one roller 107 with appurtenant abutment 108 on either side of the grinding member carrier part 105. The upper grinding member carrier part 104 is also provided with a rotatably attached roller 109, preferably a roller on either side of the carrier. For each roller the lid 89 is provided with an abutment 110, which, as shown, may be arranged for displacement in a hub 11 in the lid, and is held outwardly displaced in the hub by means of a spring 112. When the lid is closed the abutment 110 will strike the roller 109 and press the two grinding member carrier parts 104 and 105 together, at the same time tightening spring 106. In their relatively compressed position the grinding members 6 will be pressed against the side faces of the scraper blade 1. The lower grinding members 6 are in all instances spring-actuated upwardly, but this is not necessary for the upper grinding members 6 since they are spring-actuated through spring 112.

Shaft 94 carries an eccentric 112 which actuates a thrust arm 113 provided with a slot 114 engaged by a pin 115 on the bell crank lever arm 99. Upon rotation of shaft 94 the thrust arm 113 will oscillate so that the lower end of slot 114 engages pin 115 and tends to stretch the toggle joint 98, 99. This causes the two grinding members 3 to be moved away from each other to a position in which the grinding members 6 are disposed opposite the part of the side faces of the scraper blade adjacent the edge surfaces.

When the scraper blade 1 is to be removed, the grinding members 3 should always be moved so far apart as possible, and the grinding members 6 should also be moved away from the scraper blade, so that the blade may be easily removed from its carrier. The latter displacement is obtained by means of the above described split grinding member carriers 104, 105.

The means for forcibly moving the grinding members 3 away from each other comprises a push rod 116 journalled in the housing 87 and provided on its upper end with a roller 117 abutting a rest 118 on the inner side of the lid 89. When the lid is closed the push rod 116 will be thrust downwards, but when the lid is opened it may freely move upwards. The lower end of the push rod 116 has an inclined abutment edge 119 resting on a roller 120 rotatably journalled on a lever 121. The lower end of this lever rotates on a fulcrum pin 122 attached within the housing 87, and the upper end of the lever rests against a roller 123 rotatable on the end of the short arm 100 of the bell crank lever. The lever 121 is furthermore connected to the one end of a drag spring 124 attached to the housing 87, the tension of this spring being such that through the lever it may overcome the tension of the spring 103 so that it tends to stretch the toggle joint 98, 99, i. e. it tends to move the grinding members 3 apart. As long as the lid is open there is nothing to prevent such a swinging of lever 121, and consequently the opening of the lid will automatically cause the grinding members 3 to be moved apart. When the lid is closed, i. e. when the machine parts are in their operative positions, the push rod 116 is displaced downwards, and its inclined edge presses the lever 121 out of engagement with roller 123 against the action of spring 124, and then spring 103 will cause the grinding members 3 to be moved towards each other and the edge surfaces of the scraper blade.

In all the embodiments of the invention hereinbefore described and in which a cylindrical edge surface grinding member 3 is employed, the grinding member is longer than the scraper blade, but shorter than the scraper blade length plus the length of the reciprocating motion performed by the scraper blade. Further, the position of the scraper blade carrier in relation to the grinding member is such that during its movement in relation to the grinding member the scraper blade is moved past each end of the grinding surface of the grinding member. In this manner care is taken that depressions due to wear will not be formed in the grinding surface. In a similar manner care is taken that each side face grinding member aggregate on either side of a scraper blade and comprising one, two or more grinding members, has a combined width which is less than the length of the relative movement of the scraper blade in relation to the side face grinding member aggregate, and that during this relative movement the scraper blade passes both ends of the grinding member aggregate. The object of this is also to ensure an evenly distributed wear of the side face grinding member.

The invention is not restricted to the embodiments illustrated, as these may be modified in many ways within the scope of the following claims.

What I claim is:

1. In a device for grinding scraper blades having at least one edge surface to be ground, in combination, a base, an edge surface grinding member supported by said base and having a grinding surface, a scraper blade holder on said base having means for securing a scraper blade on said holder, a side face grinding aggregate supported by said base comprising at least two side face grinding members disposed at a distance from said edge surface grinding member on either side of the plane in which a scraper blade is secured on said holder, resilient means for pressing said two side grinding members towards each other, driving means on said base for providing a relative movement between said holder and said edge surface grinding member parallel to said grinding surface, said driving means also being connected to at least one of the latter said two parts, reciprocating means on said base for providing mutual reciprocating movements between said side face grinding aggregate and said holder and connected to at least one of said latter two parts, and means for repeated alternating movement of said holder and said edge surface grinding member towards and away from each other, said means being connected to at least one of the last two said parts, and whereby repeatingly the edge surface of a scraper blade retained on said holder is pressed against said grinding surface for grinding of said edge surface and away herefrom into a position in which the side edges of said edge surface are situated between said two side face grinding members for grinding the side faces of said scraper blade at the side edges of the said edge surface thereof.

2. A grinding device according to claim 1 wherein said holder is reciprocatable in the plane of the scraper blade anchored thereto, said reciprocating means being connected to said holder, and said edge surface grinding member and said side surface grinding members being stationary in the reciprocating direction of said holder.

3. In a device for grinding scraper blades having at least one edge surface to be ground, in combination, a base, an edge surface grinding member rotatably supported by said base and having a grinding surface, a scraper blade holder supported on said base and having means for securing a scraper blade on said holder with an edge surface facing said grinding surface, a side face grinding aggregate supported by said base and comprising at least two side face grinding members disposed at a distance from said edge surface grinding member on either side of the plane in which a scraper blade is retained on said scraper blade holder, means on said base for rotating said grinding member, reciprocating means on said base for providing mutual reciprocating movements between said side face grinding aggregate and said holder and connected to at least one of said two parts, resilient means for pressing said two side face grinding members towards each other, and means on said base for repeated alternating movement of said holder relative to said edge surface grinding member towards and away from each other, said means being connected to at least one of the said latter two parts, thereby alternating pressing the edge surface of a scraper blade retained on said holder against said grinding surface for grinding of said edge surface and away herefrom into a position in which the side edges of said edge surface are situated between said two side face grinding members for grinding the side faces of said scraper blade at the side edges of the side edge surface thereof.

4. The device according to claim 3, wherein said edge surface grinding member is a rotatable cylindrical grinding member.

5. The grinding device according to claim 3 wherein said edge surface grinding member is a rotatable cylindrical grinding member, the peripheral surface of which is divided into strips separated by annular grooves.

6. A grinding device according to claim 3, wherein said side face grinding aggregate provides on each side of said scraper plane a side face grinding surface facing said plane and having a total length which is less than the length of a scraper blade plus the length of the relative movement between said holder and said side face grinding aggregate.

7. In a device for grinding scraper blades having at least one edge surface to be ground, in combination, a base, an edge surface grinding member rotatably supported by said base and having a grinding surface, an extension of said grinding surface, a scraper blade holder supported on said base and having means for securing a scraper blade on said holder with an edge surface facing said grinding surface, a side face grinding aggregate supported by said base and comprising at least two side face grinding members disposed at a distance from said edge surface grinding member on either side of the plane in which a scraper blade is retained on said scraper blade holder, means on said base for rotating said grinding member, reciprocating means on said base for providing mutual reciprocating movements between said side face grinding aggregate and said holder and connected to at least one of said two parts, resilient means for pressing said two side face grinding members towards each other, and means on said base for repeated alternating movement of said holder relative to said edge surface grinding member towards and away from each other, said means being connected to at least one of the said latter two parts, thereby alternating pressing the edge surface of a scraper blade retained on said holder against said grinding surface for grinding of said edge surface and away therefrom into a position in which the side edges of said edge surface are situated between said two side face grinding members for grinding the side faces of said scraper blade at the side edges of the side edge surface thereof, said extension of said grinding surface in the direction of the reciprocating movement of said holder relative to said grinding member is less than the length of said scraper blade plus the length of the relative movement of said holder and said grinding surface.

8. In a grinding device for grinding scraper blades having at least one edge surface to be ground, in combination, a base, an edge surface grinding member having a grinding surface on said base; a driving shaft; an eccentric on said shaft; a reciprocatable and rotatable driving rod positioned parallel to said grinding surface; means connecting said eccentric and said driving rod for imparting a reciprocating movement to said driving rod from said eccentric; a supporting member attached to said driving rod and extending beyond one side thereof; a scraper blade holder removably secured to said supporting member; means for clamping a scraper blade to said holder; an edge surface of said blade faces said grinding surface and is parallel thereto; an abutment member attached to and extending laterally from said driving rod; a guide member; means for rotating said guide member; means for transmitting movements from said guide member to said abutment member; said guide member during its rotation being adapted to provide an alternately rotating movement of said abutment member about the longitudinal axis of said driving rod and thereby alternately rotates said driving rod and consequently said holder between a position in which a scraper blade has its edge surface, facing said grinding surface, abutting said grinding surface, and a position in which said scraper blade edge surface is moved away from said grinding surface; at least two side face grinding members so disposed and arranged stationary in the reciprocating direction of said driving rod that, when a scraper blade is clamped to said holder, they are positioned on either side thereof in positions in which, when the holder is in the last said position, they face the side faces of the scraper blade at the side edges of the edge surface thereof; and means for pressing said side face grinding members into positions in which they abut the side faces of the scraper blade.

9. A device according to claim 8, wherein said means for transferring movements from said guide member to said abutment member are so disposed and arranged that independent of said guide member said driving rod may be rotated in a direction by which said holder is moved away from said grinding surface.

10. A device according to claim 8 having a rotatable shaft; said edge surface grinding member constituted by a rotatable cylindrical grinding member, the grinding surface being the periphery; said cylindrical grinding member secured to said shaft for rotation together therewith; gear means connecting the last said shaft and the said driving shaft for imparting a rotating movement to said cylindrical grinding member from said driving shaft; gear means connecting said driving shaft and said guide member for imparting a rotation of said guide member; and the last said gear members so arranged that said guide member is rotated with a lower number of revolutions than said driving shaft.

11. In a grinding device for grinding scraper blades having at least one edge surface to be ground, in combination, a base, an edge surface grinding member having a grinding surface; a driving shaft; an eccentric drive on said shaft; a reciprocable driving rod connected to said drive; a scraper blade holder connected to said driving rod; means for anchoring a scraper blade on said holder; said means adapted to position an edge surface of a scraper blade facing said grinding surface; means for alternately moving of said grinding member and said holder towards and away from each other between positions in which an edge surface of a scraper blade abuts against said grinding surface and is positioned a distance therefrom, respectively; and at least two side face grinding members positioned whereby when a scraper blade is anchored to said holder, they are positioned on either side thereof in positions in which, when said holder and said grinding surface are moved away from each other, they abut the side faces of the scraper blade at the side edges of the edge surface thereof facing said grinding surface.

12. A grinding device according to claim 11, in which a supporting member is attached to said driving rod projecting to one side thereof; said holder or carrier being carried by said supporting member; said driving rod rotatable on its longitudinal axis to oscillate said scraper blade holder towards and away from said grinding surface; and said means for alternately moving of said edge surface grinding member and said holder towards and away from each other being arranged to oscillate said driving rod.

References Cited in the file of this patent

UNITED STATES PATENTS

| | | |
|---|---|---|
| 700,562 | Ruhl | May 20, 1902 |
| 731,127 | Quigley et al. | June 6, 1903 |
| 1,051,153 | Nelson | Jan. 21, 1913 |
| 1,054,006 | Lentz | Feb. 25, 1913 |
| 1,124,430 | Hart | Jan. 12, 1915 |
| 1,195,569 | Fabian | Aug. 22, 1916 |
| 1,594,246 | Dechert | July 27, 1926 |
| 1,660,350 | Owen | Feb. 28, 1928 |
| 2,353,683 | Martines | July 18, 1944 |
| 2,363,039 | Baldenhofer | Nov. 21, 1944 |
| 2,469,730 | Hutchinson | May 10, 1949 |
| 2,671,992 | Reaser et al. | Mar. 16, 1954 |